Jan. 12, 1926.  
P. ERICKSON  
POISONED FOOD CORRAL  
Filed March 11, 1925

1,569,624

Inventor:  
Peter Erickson  
By  
Attorneys

Patented Jan. 12, 1926.

1,569,624

UNITED STATES PATENT OFFICE.

PETER ERICKSON, OF OGEMA, SASKATCHEWAN, CANADA.

POISONED-FOOD CORRAL.

Application filed March 11, 1925. Serial No. 14,833.

*To all whom it may concern:*

Be it known that I, PETER ERICKSON, a subject of the King of England, residing at Ogema, Province of Saskatchewan, Dominion of Canada, have invented certain new and useful Improvements in Poisoned-Food Corrals, of which the following is a specification, reference being had therein to the accompanying drawings.

This invention relates to a poisoned-food corral, and the primary object of my invention is to provide a foldable or collapsible device that may be placed in a field, barn yard, or any place where small animals, as gophers, mice, rabbits, or the like are a nuisance, the device being designed to poison such animals and prevent destruction of growing grain, stacks of oat sheaves, small chickens and property. Some communities are bothered by rabbits destroying grasses, vegetables, and other matter and my device is adapted to provide a bait for such animals with the bait poisoned so that the animals will eventually be killed.

Another object of my invention is to provide an inclosure for a poisoned-food container which will permit various kinds of animals to reach the poisoned food container, but exclude other animals. The device is of a particular nature and may be knocked down and folded so as to occupy a comparatively small space when not in use and particularly during shipment.

The above and other objects are attained by a construction that will hereinafter be specifically described and then claimed, and reference will now be had to the drawing, wherein—

Figure 1:
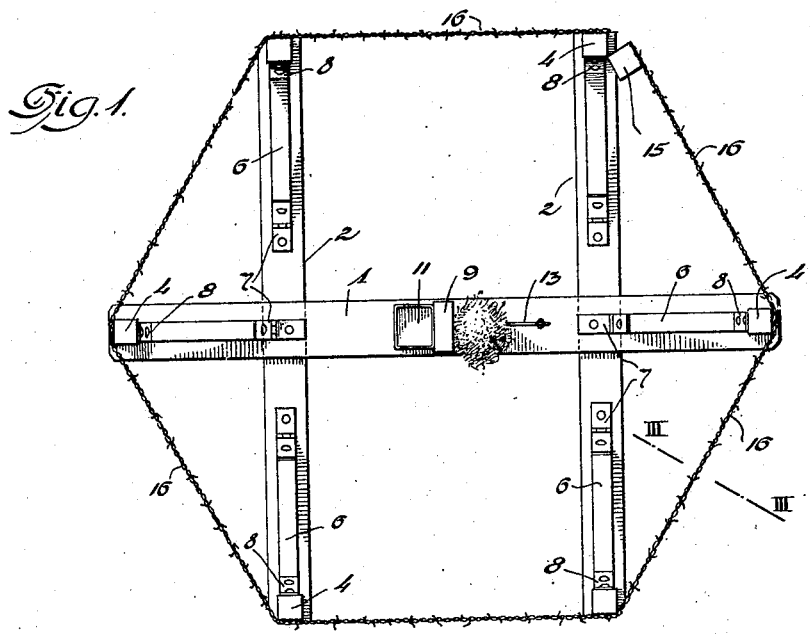
Figure 1 is a plan view of the poisoned-food corral.

The device comprises a longitudinal beam 1 and cross-beams 2, such cross beams being disposed in parallelism and at substantially right angles to the beam 1. The lower face of the beam 1 may be grooved, as at 3, to receive the beams 2 or said beams may have the upper faces thereof grooved to receive the beam 1, so that when said beams are joined they form a substantially H-shaped frame.

At the outer ends of the beams 1 and 2 are posts 4 hingedly connected to the upper faces of said beams, as at 5, so that said posts may be folded inwardly and downwardly. All of the posts are adapted to be supported in vertical positions on the ends of the beams by angularly disposed braces 6, said braces having the lower ends thereof hingedly connected, as at 7, to the beams 1 and 2 and the upper ends of said braces may be detachably connected to inner walls of the posts 4 by holdfast devices 8 of a conventional form.

Figure 4:
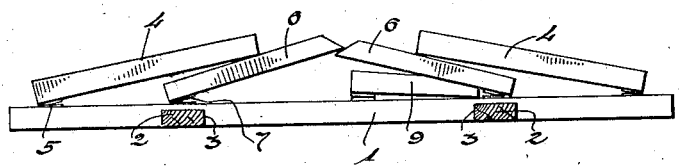
Fig. 4 shows a portion of the device folded or collapsed.

Mounted on the beam 1 intermediate the ends thereof, is an upright 9 which may also be hinged, as at 10, so that it may be folded downwardly. This upright has one face thereof provided with a poisoned-food container 11, for instance of that type disclosed by my United States Patent No. 1,233,332, dated July 17, 1917. On the opposite side of the upright is fastened a holder 12 for a suitable bait, for instance poisoned sheaf oats, grass or vegetables. This holder and the upright 9 are braced by an angularly disposed rod 13, either end of which may be disconnected so that the upright 9 may be folded, as shown in Fig. 4.

Figures 2, 3:
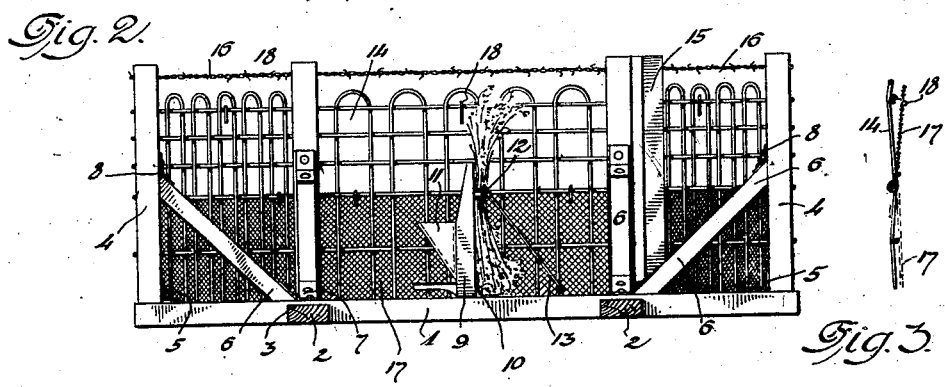
Fig. 2 is a cross-sectional view of the same.
Fig. 3 is a similar view taken on line III—III of Fig. 1.

Suitably attached to the posts 4 is a fence, generally designated 14, said fence providing a substantially hexagonal inclosure and in order that this inclosure may be entered for arranging the bait, one side of the fence is movable and constitutes a gate. An extra post 15 is used for this purpose so that the movable side of the fence may be opened and closed. The fence is made of interwoven wire suitably secured to the posts and the uppermost wire 16 is preferably of the barbed type. The upper part of the fence has the wires thereof of coarser mesh than the lower part of the fence, the upper wires being close enough together to prevent domestic animals from placing their heads through the fence, but the interstices permit jack-rabbits and the like to pass through the fence and reach the bait. The lower part of the fence may be provided with detachable screens 17 that may be used during the day time to prevent chickens, young pigs, or other small domestic animals from entering the corral, particularly when used in a farm yard, but the interstices of the screens are not so small as to exclude gophers and mice. The screens 17 may be hingedly connected to the fence, as shown in Fig. 3, so that at night it is only necessary to raise the screens, there being hooks or suitable holding devices 18 for retaining the screens elevated. The fence may be detachably connected to the posts so as to be removed when the device is to be folded or stored and for the set-up position the beams provide a substantial frame work and act as shoes or runners for shifting the device about, particularly over snow banks in the winter.

It is thought that the utility of my poisoned-food corral will be apparent without further description, and while in the drawing there is illustrated a preferred embodiment of my invention, it is to be understood that such changes as are permissible by the appended claims may be made without departing from the spirit of the invention.

What I claim is:—

1. A device of the type described comprising a frame, a fence supported by said frame and providing an inclosure, and a bait holder centrally of said frame, said bait holder including a foldable upright and a container carried thereby.

2. A poisoned-food corral comprising beams assembled to provide a frame, a fence supported from the outer ends of said beams and adapted to be collapsed, and bait supporting means carried by one of said beams centrally of said frame.

3. A poisoned-food corral comprising cross beams, posts hingedly connected to the outer ends of said beams, woven wire attached to said posts and co-operating therewith in providing an inclosure, a portion of said wire constituting a gate and bait holding means carried by one of said beams.

4. A poisoned-food corral as called for in claim 3 wherein said bait holding means includes an upright, a bait container on one side thereof, and a bait holder on the opposite side of said upright.

5. A poisoned-food corral comprising beams joined together to provide a frame, posts hingedly connected to the outer ends of said beams, braces between said beams and posts, woven wires attached to said posts and co-operating therewith in providing an inclosure, screens attached to the lower part of the woven wire, an upright hingedly connected to one of said beams centrally of said inclosure, and bait holding means carried by said upright.

In testimony whereof I affix my signature.

PETER ERICKSON.